Patented Apr. 26, 1938

2,115,479

UNITED STATES PATENT OFFICE 2,115,479

PECTIN AND METHOD OF PREPARING SAME

Neal M. Beach, Fairport, N. Y., assignor to General Foods Corporation, New York, N. Y., a corporation of Delaware No Drawing. Application August 28, 1934,
Serial No. 741,871

6 Claims. (Cl. 99—132)

This invention relates to jellifying substances and more particularly to a pectin prepared from fruit or vegetable material and to a method for preparing the same. The term "pectin" has been and is applied broadly to various substances extracted from such plant material, usually by heat and with or without added acid, which substances are characterized by their ability to form a jelly when dissolved in water with proper proportions of sugar and acid. The term "pectin" is therefore a class designation for such substances and it has been and is applied to different products having this common characteristic without any attempt to differentiate the same. Pectin has been obtained by various workers in the art following different methods of preparation and among the properties attributed to "pectin", as that term has been used in its broad sense, are that it can be precipitated by alcohol, certain metallic salts, acids and sugars. These properties, however, are not common to all of the various substances commonly included within the designation "pectin".

Dry powdered pectin produced by various methods is known. For example, solutions containing pectin have been concentrated and the pectin precipitated with alcohol and then dried and powdered. Other methods have involved precipitation by "salting out" effects and by the formation of colloidal hydroxides in the pectin solution. Dry pectin as usually marketed is soluble in water, but is mixed with a dispersing agent such as sugar to prevent the pectin from lumping when brought into contact with water. Pectin is by nature a gum and it is customary practice in handling gums, particularly in the pharmaceutical art, to add sugar or other suitable substances as dispersing agents.

Salts of pectin and alkaline earth metals such as barium and calcium have also been produced. For example, Fremy, J. pharm. Chim (3), 12(1847)13, changed insoluble pectose, now often referred to as protopectin, to pectin by boiling with weak acids. By heating this pectin with dilute acid he caused it to form what he called "parapectin" and "metapectin", the latter possessing the characteristic property of precipitating with BaCl₂, an alkaline earth chloride. These alkaline earth salts of pectin may be termed pectinates to distinguish them from pectates which are salts of pectic acid. They disperse readily in cold water, but are insoluble in water without added acid. By washing with acidified alcohol or otherwise treating them to remove the calcium, barium, etc., pectin may be obtained which is readily soluble in water but like the soluble pectin described above is subject to lumping.

One of the objects of this invention is to provide a pectin which needs no dispersing agent to prevent it from lumping but on the contrary disperses readily of itself when added to water without the formation of hard, difficultly soluble lumps and which at the same time is fairly soluble in hot water.

Another object is to provide a method of making a pectin having the above characteristics which consists in treating a calcium-precipitable pectin to vary its calcium content. Other objects will appear more fully hereinafter.

Pectin having the desired characteristics can be prepared from both the soluble pectin and the insoluble pectin described above; for example, if the desired product is to be made from an insoluble calcium pectinate, calcium must be removed and if it is to be made from a soluble calcium-precipitable pectin or calcium pectinate which lumps or gums, calcium must be added, as will appear more fully hereinafter.

A product having the characteristics set forth above may be obtained by the process described hereinafter from alkaline earth salts of pectin of the general type disclosed by Fremy and particularly from calcium pectinates which are desirable because the presence of the calcium does not detract from the edibility of the product. These salts are readily dispersible in cold water but are insoluble even in hot water. As the calcium is removed, however, the calcium pectinate passes from this state to a state wherein it is readily soluble in water but no longer disperses when mixed with water. The following table shows by way of example the results of a test of the transition stages in solubility and dispersibility as calcium is removed from calcium pectinate prepared by the Olsen and Stuewer process hereinafter described:

| | | Dispersibility in cold water | Solubility in hot water | Classification |
|---|---|---|---|---|
| 1 | Original calcium pectinate precipitate. | Good | Insoluble | Insoluble. |
| 2 | Same washed with ⅛ usual amount of acid. | Good | Shows tendency to dissolve but remains grainy and turbid. | Insoluble. |
| 3 | Same as 1, washed with ¼ usual amount of acid. | Good | Fairly soluble | Semisoluble. |
| 4 | Same as 1, washed with ½ usual amount of acid. | Good | Completely soluble. | Semisoluble. |
| 5 | Same as 1, washed with regular amount of acid. | Floats and gums. | Completely soluble if dispersed but difficult to disperse without sugar. | Soluble. |

Hence the solubility of calcium pectinate increases and the dispersibility decreases as the calcium content is reduced. Intermediate between insoluble calcium pectinate and soluble calcium pectinate there is a semi-soluble product which in finely divided form disperses without lumping or gumming, is fairly insoluble in cold water, i. e. water at about room temperature, and fairly soluble in hot or boiling water. Wherever the term "semi-soluble" occurs in this specification and the claims, it refers to this property of insolubility in cold water and solubility in boiling water. Products 3 and 4 in the above table are classified as "semi-soluble".

This readily dispersible and semi-soluble pectin requires no dispersing agent and can be used in making jams and jellies with excellent results. In using it the pectin is simply mixed with the water or fruit juice with stirring. Other materials may be mixed with the pectin for different purposes, for example, sugar to give bulk to the pectin, the amount of pectin necessary for a jelly batch as made by the housewife being very small and dilution by some neutral substance being desirable for practical reasons such as convenience in handling; or acid to impart necessary tartness to the jelly. The calcium content of this semi-soluble calcium pectinate is high enough so that the pectin swells sufficiently slowly to permit proper dispersion and low enough so that the solubility is such that the pectin can go into solution sufficiently well when heated.

The calcium pectinate to be treated may be obtained, for example, by the process disclosed and claimed in the copending application of Aksel G. Olsen and Reinhold Stuewer, Serial No. 741,870, filed Aug. 28, 1934. In the Olsen and Stuewer process, dried apple pomace is subjected to a "pickling" treatment with mineral acid such as hydrochloric, the acid being mixed with the pomace and the mass being heated at a temperature of about 40° C. for a period of 46 to 47 hours. During this pickling operation the mass is in an essentially solid state, and the amount of acid added is sufficient to provide a pH less than 1.0. Under these conditions the original protopectin is converted to pectin to calcium precipitable pectin and the progress of the conversion is gradual and progressive so that the pickling can be stopped at the desired point. Thereafter the pectin is extracted from the pickled mass by diluting with water and heating and the pectin is then precipitated from the solution in the form of calcium pectinate by adding calcium salts, such as calcium carbonate and calcium chloride.

The calcium content of the calcium pectinate obtained by the process described above or otherwise can be reduced to obtain the product of the present invention by washing with acidified alcohol. The acidified alcohol should be of such concentration that the ash constituents will be readily soluble while the pectin itself will not be soluble, the alcohol being acidified preferably with HCl. If acidified alcohol (for example, 50% alcohol) is used in the ratio of about 3 parts to 1 part of calcium pectinate and the acid concentration is about 1.5% HCl, the amount of calcium removed will be such as to produce the soluble product corresponding to product 5 of the above table. By using less amounts of acid as indicated in the table, the semi-soluble products corresponding to products 3 and 4 of the table will be produced. For example, to produce product 4 one part of calcium pectinate is washed with about three parts of acidified alcohol, the acid concentration being reduced to about 0.7%. These products embody the present invention.

This dispersible, semi-soluble pectin in powder form spreads rapidly on the surface of water, without caking or lumping. The particles take up water but do not stick together, and when wet or swollen tend to sink. The particles do not peptize in water at room temperature but do so on heating the water. This pectin peptizes readily after dispersion in fruit juice and heating. A dispersion of this pectin in water at room temperature will peptize readily if acid is added to the dispersion.

Simple laboratory tests in connection with regular factory practices will enable one to determine the extent of washing necessary to convert the insoluble calcium pectinate into the semi-soluble form. This is absolutely reliable and simpler than a determination of actual calcium content, which is not necessarily constant and may vary. Soluble calcium pectinate in powder form can be converted into semi-soluble calcium pectinate by treatment with definite amounts of calcium acetate in alcoholic solution, soluble calcium pectinate having the property of taking up additional calcium.

It will be understood that the insoluble calcium pectinate from which the calcium is removed may be obtained from any other suitable source than the Olsen and Stuewer process described above. It will further be understood that from the standpoint of the semi-soluble calcium pectinate per se, any suitable or known method of reducing the calcium content may be employed other than the washing process described above. Furthermore, a product having the desired characteristics can be produced from a soluble calcium pectinate corresponding to product 5 of the above table by treating it with calcium acetate in alcoholic solution as described above.

Various modifications of the details of procedure set forth above will readily occur to those skilled in the art and it will be understood that such modifications are within the spirit of the invention and that reference is to be had to the appended claims to define the limits of the invention.

What is claimed is:—

1. A method of producing semi-soluble calcium pectinate which consists in washing insoluble calcium pectinate with a predetermined quantity of acidified alcohol to reduce the calcium content sufficiently to render the calcium pectinate non-lumping and readily dispersible when mixed with water, and at least fairly soluble in boiling water.

2. A method of producing semi-soluble and dispersible calcium pectinate which consists in removing calcium from insoluble calcium pectinate sufficiently to render the calcium pectinate non-lumping and readily dispersible when mixed with water and at least fairly soluble in boiling water.

3. A method of producing semi-soluble and dispersible calcium pectinate which consists in treating a calcium-precipitable pectin to vary its calcium content and stopping the treatment when the calcium content is such that the salt is readily dispersible when mixed with water and at least fairly soluble in boiling water.

4. A dry semi-soluble calcium pectinate containing sufficient calcium to render it non-lumping and readily dispersible when mixed in powdered form with water and further characterized by being at least fairly soluble in boiling water.

5. A method of producing semi-soluble and dispersible calcium pectinate which consists in increasing the calcium content of soluble calcium-precipitable pectin sufficiently to render the same non-lumping and readily dispersible when mixed with water and at least fairly soluble in boiling water.

6. A method of producing semi-soluble and dispersible calcium pectinate which consists in adding calcium to a soluble pectin to render the same non-lumping and readily dispersible when mixed with water and at least fairly soluble in boiling water.

NEAL M. BEACH.